United States Patent [19]
Motzko et al.

[11] Patent Number: 6,016,043
[45] Date of Patent: Jan. 18, 2000

[54] METHOD AND APPARATUS FOR CONTROLLING A MOTOR IN A DISC DRIVE BY MODULATING THE COMMUTATION ANGLE

[75] Inventors: Andrew R. Motzko, Burnsville; Garry E. Korbel, New Prague, both of Minn.; John M. Baker, Tuttle; Stuart K. Francis, Oklahoma City, both of Okla.

[73] Assignee: Seagate Technology, Inc., Scotts Valley, Calif.

[21] Appl. No.: 09/014,756

[22] Filed: Jan. 28, 1998

Related U.S. Application Data

[63] Continuation-in-part of application No. 08/864,509, May 28, 1997.
[60] Provisional application No. 60/036,580, Jan. 29, 1997, and provisional application No. 60/063,228, Oct. 23, 1997.
[51] Int. Cl.[7] .................................................... G05B 1/02
[52] U.S. Cl. ................................. 318/606; 388/801
[58] Field of Search ........................ 318/606, 609, 318/610, 162, 254, 138, 439; 388/800–806

[56] References Cited

U.S. PATENT DOCUMENTS

| | | | |
|---|---|---|---|
| 4,308,508 | 12/1981 | Sommer et al. | 332/18 |
| 4,638,383 | 1/1987 | McGinlay et al. | 360/77 |
| 4,783,705 | 11/1988 | Moon et al. | 360/77 |
| 4,947,093 | 8/1990 | Dunstan et al. | 318/560 |
| 5,220,433 | 6/1993 | Mogamiya et al. | 358/310 |
| 5,406,181 | 4/1995 | Wakui | 318/560 |
| 5,517,631 | 5/1996 | Machado et al. | 395/438 |
| 5,530,326 | 6/1996 | Galvin et al. | 318/254 |
| 5,744,928 | 4/1998 | Tang et al. | 318/610 |

*Primary Examiner*—Robert E. Nappi
*Assistant Examiner*—Rina I. Duda
*Attorney, Agent, or Firm*—Westman Champlin & Kelly P.A.

[57] ABSTRACT

A motor control circuit controls a motor in a disc drive is provided. The motor control circuit includes a commutation circuit which provides commutation signals to the motor to commutate the motor at a commutation frequency. A frequency modulation circuit is operably coupled to the commutation circuit. The frequency modulation circuit provides a modulation signal which frequency modulates the commutation frequency according to a predetermined pattern.

19 Claims, 5 Drawing Sheets

METHOD AND APPARATUS FOR CONTROLLING A MOTOR IN A DISC DRIVE BY MODULATING THE COMMUTATION ANGLE

REFERENCE TO RELATED APPLICATIONS

The present application is based on a provisional applications Ser. No. 60/036,580 filed on Jan. 29, 1997, entitled ACOUSTIC NOISE REDUCTION FOR DISC DRIVE SPINDLE MOTORS BY MODULATING THE COMMUTATION ANGLE and Ser. No. 60/063,228 entitled ACOUSTIC NOISE REDUCTION FOR DISC DRIVE SPINDLE MOTORS BY MODULATING THE COMMUTATION ANGLE filed on Oct. 23, 1997, and is a continuation-in-part of co-pending application Ser. No. 08/864,509 filed on May 28, 1997, entitled A CIRCUIT AND METHOD FOR MODULATING THE COMMUTATION FREQUENCY OF A DISC DRIVE MOTOR, all of which are assigned to the same assignee as the present application.

FIELD OF THE INVENTION

The present invention relates generally to controlling the commutation frequency of a disc drive motor. More particularly, the present invention relates to modulating the commutation frequency.

BACKGROUND OF THE INVENTION

A brushless direct current (DC) motor is typically used to drive rotation of the spindle which carries a plurality of discs in a disc drive system. A brushless DC motor typically has a number of permanent magnets mounted on a rotor and a set of electromagnetic coils mounted on a stator. The rotor is made to rotate by energizing the coils in a specific sequence relative to the angular position of the rotor. The function of energizing the coils at specific points in the rotation is called "commutation" of the motor.

One prior method of motor commutation uses Hall sensors mounted on the stator for sensing the angular position of the rotor. Electronic circuits connected to the Hall sensors detect the passage of the rotor past the Hall sensors and switch the energy into a different electromagnetic coil (commutate) at that instant.

A second commutation method is based on back electromotive force (EMF) sensing. When the rotor rotates due to a coil being energized, an electromagnetic field is induced in the coils which are not currently energized. By sensing the resulting back EMF, the correct commutation state of the motor can be determined. Back EMF commutation has advantages in that it does not require the use of Hall sensors which tend to be large, and can be expensive.

The information derived from the back EMF is used to drive a voltage controlled oscillator (VCO) in a phase locked loop control circuit. The output of the VCO is used to precisely clock commutation control logic which correctly commutates the motor for maximum torque efficiency, and motor direction.

While this type of motor commutation control circuit provides an excellent means of precisely commutating the motor at the optimum time, it has a drawback in that it creates a very pure tone, jitter free, commutation signal. Also, this signal is used to feed the motor through highly efficient, fast switching, power field effect transistors. Thus, high rates of current change in the motor coils are induced, and can cause audible mechanical resonances at the commutation frequency, and at harmonics of the commutation frequency. Further, such a system can exhibit electromagnetic radiation at high enough levels that it can become a concern, especially in the high frequency harmonics of the exceptionally jitter free commutation signal provided. If the unwanted resonances and radiation reaches a sufficient amplitude, they can lead to undesirable audible noise, servo track following errors and read/write errors.

The present invention addresses these and other problems, and offers other advantages over the prior art.

SUMMARY OF THE INVENTION

The present invention relates to a system which addresses one or more of the above-mentioned problems.

In accordance with one embodiment of the invention, a motor control circuit controls a motor in a disc drive. The motor control circuit includes a commutation circuit which provides commutation signals to the motor to commutate the motor at a commutation frequency. A frequency modulation circuit is operably coupled to the commutation circuit. The frequency modulation circuit provides a modulation signal which frequency modulates the commutation frequency according to a predetermined pattern.

The present invention can also be implemented as a method of controlling a spindle motor in a disc drive. A commutation timing signal is provided. The motor is commutated by providing a plurality of commutation signals to the motor at a commutation frequency based on the commutation timing signal. The commutation timing signal is frequency modulated according to a modulation waveform having a predetermined pattern possessing a frequency spectrum which has a spectral content that exhibits peaks at frequencies other than the commutation frequency and predetermined harmonics of the commutation frequency.

These and various other features as well as advantages which characterize the present invention will be apparent upon reading the following detailed description and review of the associated drawings.

DETAILED DESCRIPTION OF THE PREFERRED EMBODIMENTS

Figure 1:
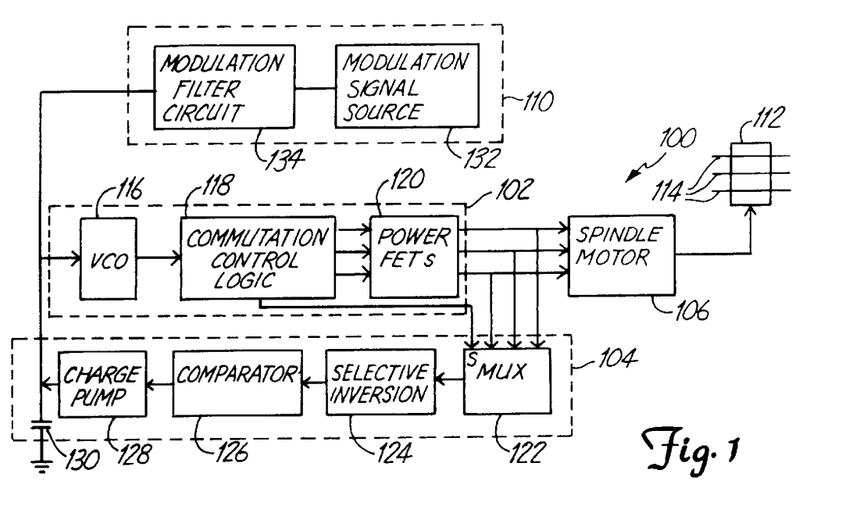
FIG. 1 is a block diagram of a commutation control circuit in accordance with one preferred embodiment of the present invention.

FIG. 1 is a block diagram of a motor control circuit 100 in accordance with one preferred embodiment of the present invention. A system, such as system 100, includes commutation signal generator circuit 102, phase locked feedback circuit 104, spindle motor 106, and modulation circuit 110. Motor 106 is also diagrammatically shown coupled to spindle 112 which is illustrated supporting a plurality of data storage discs 114, for rotation with spindle 112.

Commutation signal generator circuit 102, in one preferred embodiment, includes voltage controlled oscillator (VCO) 116, commutation control logic 118 and power field effect transistors (power FETs) 120. Phase locked feedback circuit 104 includes multiplexer (MUX) 122, selective inversion circuit 124, comparator 126, charge pump 128, and phase locked loop (PLL) filter capacitor 130.

Modulation circuit 110, in one preferred embodiment, includes modulation signal source 132 and modulation filter circuit 134. The output of modulation circuit 110 (i.e., the output of modulation filter circuit 134) is coupled to an input of VCO 116. Phase locked feedback circuit 104 provides a feedback signal to PLL filter capacitor 130, which is also coupled to the input of VCO 116.

The conventional operation of system 100 will be described with reference to the waveforms illustrated in FIG. 2. Phase locked feedback circuit 104 senses the back EMF associated with spindle motor 106. An analog signal indicative of the back EMF sensed is provided by phase locked feedback circuit 104 to VCO 116. Based upon the back EMF sensed, VCO 116 provides a square wave output signal at a frequency determined by the analog input signal to VCO 116. The square wave output signal is indicated by waveform 136 in FIG. 2.

Commutation control logic 118 receives signal 136 from VCO 116 and provides the gate drive signals 138, 140, 142 to the power FETs 120 driving the motor. The output of the power FETs 120 are provided to spindle motor 106 and are used to drive spindle motor 106. Each motor phase is driven by the power FETs in all of the states, except for the transition states from a low to a high signal, and from a high to a low signal. Thus each phase, is driven by a power FET 120 to a high voltage for two commutation periods (illustrated by waveform 136) is in transition for one commutation period, is driven low for two commutation periods, and is back in transition for the final commutation period. This cycle repeats every six commutation periods (or commutation counts) with each motor phase being delayed by 120° electrical from the others.

Multiplexer 122 receives, as its inputs, the commutation control signals provided to drive the power FETs 120. The multiplexer 122 is configured to select, and provide at its output, based on an output of commutation control logic 118, each of the commutation signals, in turn, during that particular commutation signal's undriven phase. The output of multiplexer 122 is thus illustrated by waveform 144 in FIG. 2.

Figure 2:
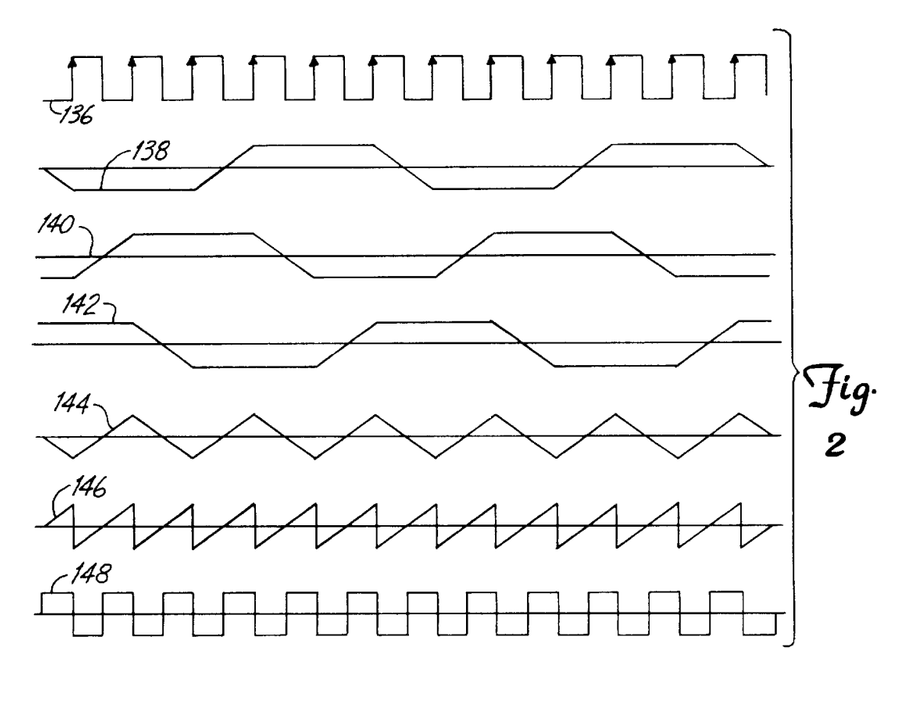
FIG. 2 is a timing diagram illustrating operation of the circuit shown in FIG. 1, without modulation.

For the idealized transitions shown in FIG. 2, where the commutation signals are precisely in phase with the motor, multiplexer signal 144 is a perfectly triangular waveform. Signal 144 is provided to selective invertor 124 where it is selectively inverted. This results in a sawtooth waveform 146. The particular waveform 146 shown in FIG. 2 corresponds to the commutation signals and the motor being precisely in phase. Thus, waveform 146 is greater than the center voltage exactly 50% of the time, and is less than the center voltage exactly 50% of the time.

During commutation/motor phase errors, waveform 144 is distorted making it non-symmetrical about the center voltage. The amount of non-symmetry corresponds to the phase error, and the average voltage value relative to the center voltage becomes non-zero. This creates an error in signal 146 such that signal 146 is either greater than the center voltage, or less than the center voltage (depending on the direction of the phase error) in excess of 50% of the time.

This error signal 144 is fed through comparator 126 where it is compared with the center voltage and is used to drive charge pump 128 which is connected to PLL filter capacitor 130. When signal 146 has a 50% duty cycle (i.e., it is above the center voltage 50% of the time and below the center voltage 50% of the time) PLL filter capacitor 130 is charged and discharged by the same amount (as indicated by waveform 148 in FIG. 2) creating no net change in the voltage fed into VCO 116. However, any phase errors cause an unequal amount of charge or discharge on PLL filter capacitor 130, leading to a net change in voltage fed into VCO 116. This causes the commutation frequency to adapt to, and track, the physical position of spindle motor 106. This type of circuit, by itself, results in an output frequency of signal 136, from VCO 116, which is very stable, has very low jitter, and which exhibits power that is distributed into tight bands in the frequency domain at multiples of the commutation frequency.

In accordance with the present invention, modulation circuit 110 is provided and has a modulation output signal connected to the input of VCO 116. Modulation circuit 110, in one preferred embodiment, includes modulation signal source 132 and modulation filter circuit 134. The output of modulation filter circuit 134 is connected directly to PLL filter capacitor 130. This connection effectively creates the ability to add to, or subtract from, the charge current flowing to PLL filter capacitor 130. The net change in charge current leads to a change in the voltage at the input of VCO 116, and therefore results in a change in the VCO output frequency represented by waveform 136. This, in turn, causes a change in the commutation frequency.

Figure 3:
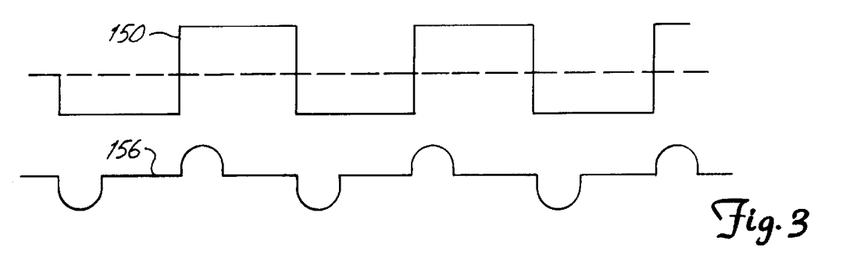
FIG. 3 is a timing diagram illustrating one preferred embodiment of modulation waveforms.

In one embodiment of the present invention, modulation signal source 132 is configured to provide an output which is simply a square wave illustrated by waveform 150 in FIG. 3. Square wave 150 can be generated with a period that is synchronous with motor speed, or asynchronous. However, any suitable modulation signal source 132 can be used, so long as it generates a signal which spreads the commutation signal frequency spectrum. For instance, the modulation signal source 132 need not even provide a square wave, but could provide any suitable signal containing desired modulation frequency components which are chosen based on the particular existing control loop, the resonant frequencies of the materials used in the particular drive, the modulation filter circuit 134 which is designed, or the particular frequency of electromagnetic radiation which is desired to be reduced.

Figure 4:
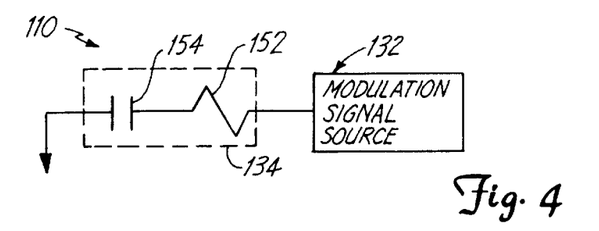
FIG. 4 is a block diagram, shown in partial schematic form, of one preferred embodiment of a modulation circuit shown in FIG. 1.

Modulation filter circuit 134 is shown in FIG. 4 and includes, in one preferred embodiment, series connected resistor 152 and capacitor 154 which serve to differentiate square wave 150. This differentiation yields an impulse function represented by waveform 156 in FIG. 3 at the positive and negative transitions of square wave 150. The impulse function essentially becomes representative of the current added to, and subtracted from, PLL filter capacitor 130. The particular component values in modulation filter circuit 134 determine the amount of charge injected at each impulse.

Figure 5:
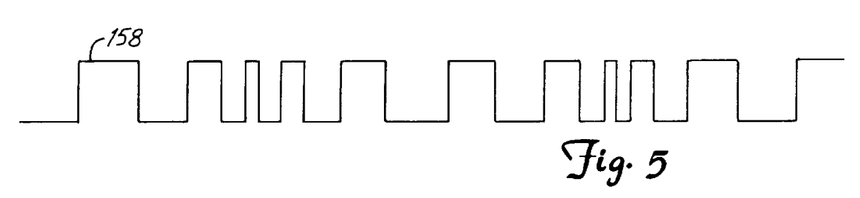
FIG. 5 illustrates timing diagrams of the commutation timing signal provided by the voltage controlled oscillator, under modulation.

FIG. 5 illustrates waveform 158 (which is exaggerated for the sake of clarity) which represents the output of VCO 116 when modulation circuit 110 is added to the system. As waveform 158 illustrates, the modulation signal tends to smear the output pulses from VCO 116 between two frequencies. The average frequency of the output of VCO 116 over time does not change, because spindle motor 106 is rotating at substantially the same speed. However, smearing the output frequency of VCO 116 (and consequently the commutation frequency) between two frequencies results in the power distribution of the commutation signals in the frequency domain having more, shorter and broader peaks around the output frequency, and around the harmonics of the output frequency than would otherwise be the case without modulation.

Figure 6:
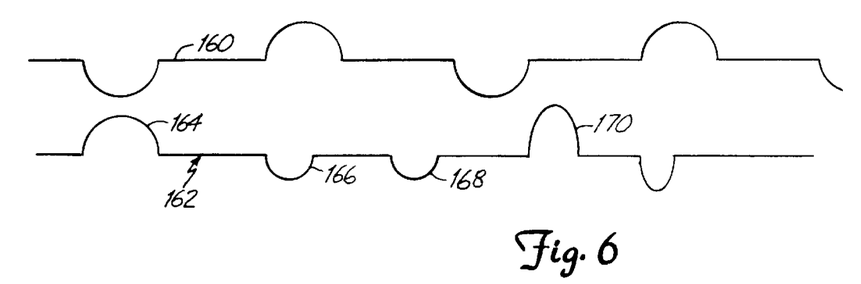
FIG. 6 illustrates other preferred embodiments of modulation waveforms in accordance with the present invention.

While waveform 156 in FIG. 3 represents one preferred embodiment of the modulation signal provided to PLL filter capacitor 130, and while this signal represents an embodiment in which the VCO output frequency is modulated between two frequencies, it should be recognized that other modulation signals can be used as well. FIG. 6 illustrates a number of other examples of modulation signals which can be used. Waveform 160 illustrates a modulation signal which can be implemented simply by changing the components in modulation filter circuit 134. The impulses provided by modulation waveform 160 are broader and have a greater amplitude than those illustrated in waveform 156. This causes the output frequency of VCO 116 to be modulated between two frequencies which are further apart than those illustrated by modulation waveform 156.

Waveform 162 illustrates another preferred embodiment in which the output frequency of VCO 116 is modulated among more than two frequencies. For instance, when pulse 164 of waveform 162 is applied to PLL filter capacitor 130, the output frequency of VCO 116 is modulated to a first, higher frequency. Then, when pulse 166 is applied to PLL filter capacitor 130, the output frequency of VCO 116 is modulated to a second frequency, lower than the first frequency. When pulse 168 is applied to PLL filter capacitor 130, the output frequency of VCO 116 is modulated to a third frequency, even lower than the second frequency. Then, when pulse 170 is applied to PLL filter capacitor 130, the output frequency of VCO 116 is modulated back to a higher frequency, which is high then the second frequency, but lower than the first frequency. This type of modulation can continue in any predetermined pattern, or in a pseudo-random pattern.

Figure 7:
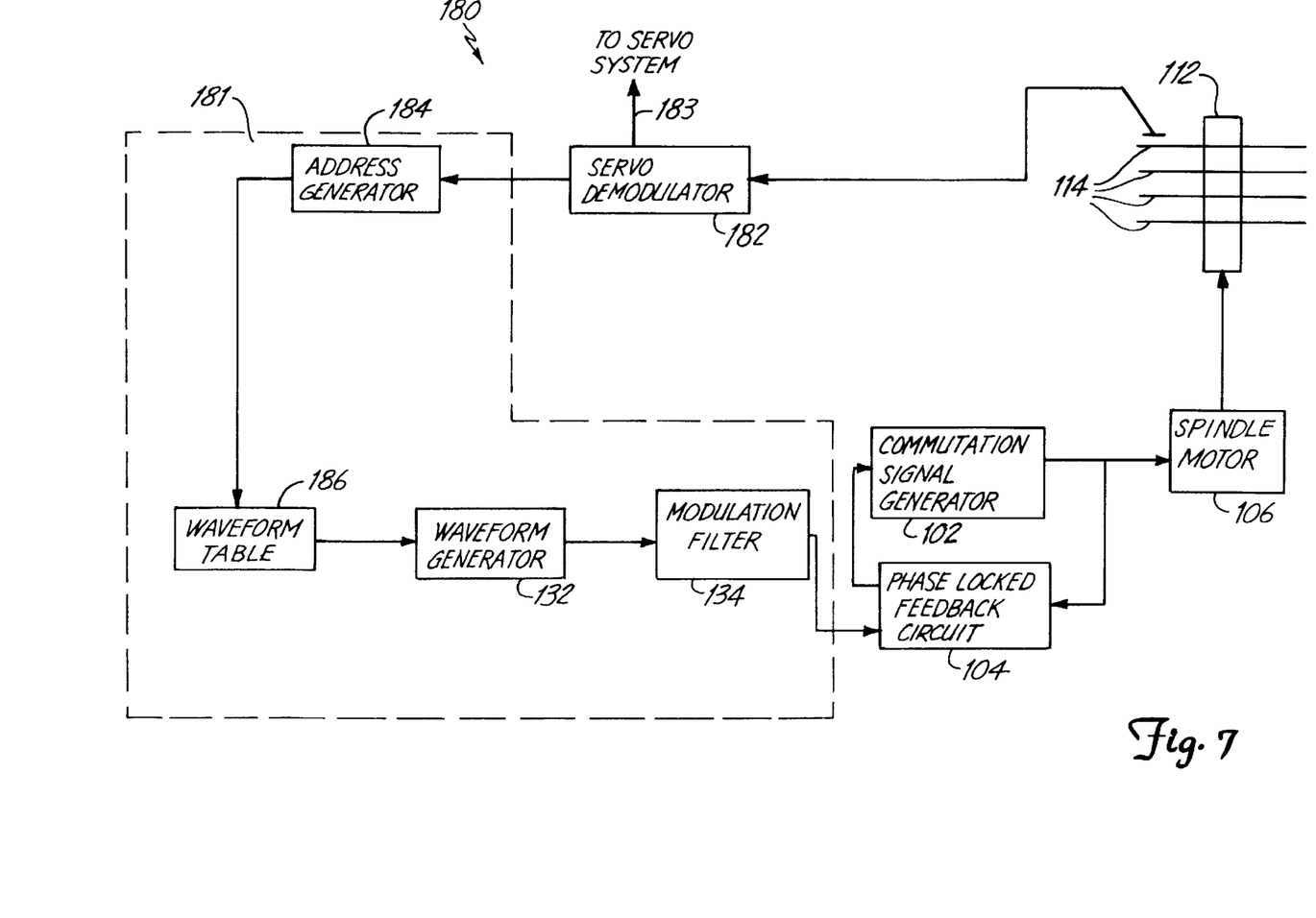
FIG. 7 is a block diagram of a second embodiment of a commutation control circuit in accordance with one aspect of the present invention.

FIG. 7 illustrates another commutation system 180 in accordance with another aspect of the present invention. Commutation system 180 includes some similar portions to those shown in FIG. 1, and they are similarly numbered. However, system 180 also includes servo demodulator 182, address generator 184, and waveform table 186. System 180 shown in FIG. 7 illustrates one preferred way in which demodulation waveform is generated in accordance with the present invention.

System 180 illustrates one system with which a modulation waveform can be derived, and applied to the capacitor 130 in phase locked feedback circuit 104 in order to modulate the commutation frequency (or commutation angle) used to commutate spindle motor 106. It should be noted, at the outset, that typical disc drives operate on a closed loop, negative feedback servo system. The servo system reads servo positioning information from at least one disc surface of one of discs 114 in the drive. The servo information is used to determine the precise position of the transducer (or data head) relative to the center of a data or servo track recorded on the disc surface.

In an embedded servo system, servo information is recorded on each disc surface, along with user data. The servo information is recorded in a servo sector, or a plurality of servo sectors, on each disc surface. As the data head flies above the servo sector, it reads the servo information recorded thereon and provides it to servo demodulator 182. Servo demodulator 182 demodulates the servo information and provides it at an output 183 to a remainder of the servo positioning system (not shown) where the demodulated servo information is used to adjust the position of the transducer (or data head) relative to the disc surface from which the servo information was read in order to perform a track seek operation or a track following operation. The servo sectors are placed at precisely spaced intervals such that if the motor is rotating at a constant speed the servo information will be detected at constantly spaced intervals in time, regardless of the actual position of the data head relative to the disc center. A digital signal indicating the detection of the servo information is thus used to indicate the motor speed by measuring the time between each generation of that signal.

Frequency modulation of the commutation angle (or commutation frequency), acts to add a low level of torque disturbance which spreads the energy available to excite any pure tone that the drive would otherwise produce, and to spread that tone out in the frequency domain. This results in a tone which sounds to the human ear more like white background noise which can be more easily tuned out. Frequency modulation of the commutation angle can, in some instances, be more effective than modulation with a fixed frequency modulation waveform because by carefully controlling the modulation parameters, it is possible to generate a disturbance with stronger harmonics in the higher frequency ranges where the pure tones reside, than it is with a simple square wave modulation signal whose spectrum drops off exponentially as frequency increases.

Specifically, a frequency modulated signal is described in terms of a carrier frequency and an integral of some modulating frequency or frequencies as follows:

$$M(t)=A_c*\sin(\omega_c t + K_v \int V(t)dt)$$

where $A_c$ represents the amplitude of the carrier signal;
$\omega_c$ is a constant carrier frequency;
$K_v$ is a multiplying constant; and
V(t) is the modulating waveform.

Two modulating signals which have been observed to be effective include a signal which produces a swept sine modulation waveform and a sum-of-sines modulation waveform. The swept sine waveform has a modulation frequency component based on a series of frequencies between the start and end of the "sweep". The sum-of-sines waveform has a modulation frequency component which is based upon one or more discrete frequencies. Other modulation waveforms can be used, but it is believed that one which is based upon a plurality of frequencies (such as the swept sine modulation or the sum-of-sines modulation) can be most effective because the combination of multiple frequencies can produce higher levels of harmonics at higher frequencies, between the commutation frequencies and selected harmonics of the commutation frequencies, to more effectively spread the frequency spectrum to reduce peaks which appear at pure tone frequencies.

For example, in one embodiment, it is believed that the switching frequency, (the number of poles times the rotational speed) and the third, sixth, and ninth harmonics of the switching frequency actually provide the highest pure tone acoustic emissions. Thus, a frequency modulation signal which produces high level harmonics at higher frequencies, displaced from the switching frequency, and the third, sixth and ninth harmonics, would tend to spread the frequency spectrum of the commutation signal to reduce the acoustic emissions at the pure tone frequencies.

As one example, the sum-of-sines frequency modulation signal is represented as follows:

$$fm=\sin((\omega_c*t+\sin(\omega_1*t)+(\omega_2*t))$$

where $\omega_c$ equals the carrier frequency;

$\omega_1$ equals a first modulation frequency; and $\omega_2$ equals a second modulation frequency.

The frequencies $\omega_1$ and $\omega_2$ are selected so that their sums and differences yield harmonics between frequencies at which pure tone acoustic emissions are exhibited, in order to appropriate energy from the pure tone frequencies.

Referring again to FIG. 7, and in accordance with one aspect of the present invention, the signal provided by servo demodulator 182 is also provided to address generator 184. Address generator 184 generates an address which is used to address a memory which contains waveform table 186. Waveform table 186, in one preferred embodiment, contains a plurality of words, each formed of a plurality of binary bits. The binary bits are read out of waveform table 186 in sequence, and the logic level of the binary bits indicates a sign of the modulation waveform at a predetermined time relative to the charge on capacitor 130. Thus, the bits which are sequentially read from waveform table 186 form a bit stream which determines the predetermined pattern of the modulation waveform to be used in modulating the commutation frequency. The bit is, in turn, provided to waveform generator 132 which generates the modulation waveform according to the predetermined pattern defined by the bits in waveform table 186, and provides that waveform to modulation filter 134. Modulation filter 134 acts to couple the modulation waveform generated by waveform generator 132 into the modulation timing signal provided by phase locked feedback circuit 104 to commutation signal generator 102. This, of course, as described above, modulates the commutation frequency at which spindle motor 106 is commutated.

TABLE 1

| PAM Address | Table value (16-bit hex) | Table value (binary) | | | | Word Number |
|---|---|---|---|---|---|---|
| | | 0123 | 4567 | 89AB | CDEF | |
| 2c79 | fc1c | 1111 | 1100 | 0001 | 1100 | 0 |
| 2c7a | f014 | 1111 | 0000 | 0001 | 0100 | 1 |
| 2c7b | ff00 | 1111 | 1111 | 0000 | 0000 | 2 |
| 2c7c | 07c0 | 0000 | 0111 | 1100 | 0000 | 3 |
| 2c7d | 001f | 0000 | 0000 | 0001 | 1111 | 4 |

Table 1 illustrates one example of a portion of a waveform table 186 which stores values indicative of a digitized waveform to be used in modulating the commutation angle. In one preferred embodiment, waveform table 186 (a portion of which is shown in Table 1) is stored in program random access memory (RAM) in the disc drive controller associated with a disc drive employing the present invention. Table 186 is accessed as a series of bits using a bit pointer. The pointer advances by one location each time a servo sector is read from the surface of disc 114 then being accessed. The bit read out from the table is used to set the polarity (or sign) of the modulation waveform relative to the charge on capacitor 130 until a next servo sector is encountered by the data head. As Table 1 illustrates, waveform table 186 includes a RAM address representing the address in the program RAM at which the table is stored, a table value wherein each 16 bits are represented in hexadecimal form, a bit position indicator indicating a bit location within a word, a binary table value, and a word number. Of course, in the implementation of waveform table 186, both the binary value and the hexadecimal value need not be used. They are simply provided for purposes of illustration.

Figure 8:
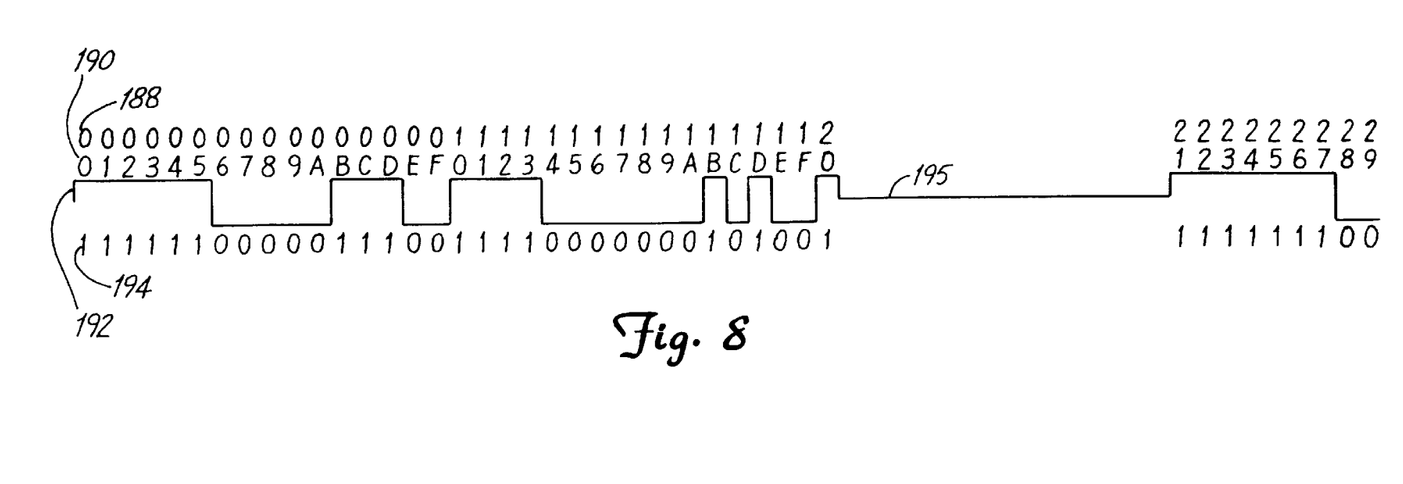
FIG. 8 illustrates one embodiment of how a modulation waveform is generated.

In a preferred embodiment, the bit pointer is used and is successively advanced, by address generator 104, through bit locations in waveform table 186. Each bit location contains a binary value (a one or a zero) which indicates whether the waveform generated by waveform generator 132 is to have a positive or negative polarity relative to the charge pump in phase locked feedback circuit 104. Address generator 184 preferably advances the bit pointer (or increments it) by one position each time a new servo frame is encountered by the data head reading information from the selected disc surface. FIG. 8 illustrates a correlation between the values shown in Table 1, and the generated modulation waveform. FIG. 8 includes a row 188 indicative of the word number, a row 190 indicative of the bit position in each word read from Table 1, a modulating waveform 192, and a row 194 indicative of the binary value at each bit position read from Table 1.

FIG. 8 illustrates the bit pattern 194, and the consequent modulation waveform 192, which is generated by reading the first three hexadecimal words from Table 1. Thus, when the bit pointer is at the beginning of the waveform table, and a next servo frame is encountered by the data head over the selected disc surface, address generator 184 generates an address which is provided to the memory storing waveform table 186 which causes waveform table 186 to provide, at its output, either a single bit, or a full hexadecimal word, or a binary representation of the hexadecimal word, then being addressed. For the sake of simplicity, the present description will proceed with respect to waveform table 186 providing at its output only a single address bit.

In the instance in which the bit pointer is at the beginning of Table 1, and the servo frame is encountered, waveform table 186 provides at its output a binary 1 value. That is because, for the first word entered in the table (word zero), and for the first bit position in that word (position zero), the binary value stored in that location is a one. Since waveform table 186 provides, at its output, a one, and since that binary value is provided to waveform generator 132, waveform generator 132 generates a waveform 192 having a first polarity (in the embodiment shown in FIG. 8, it is a positive polarity).

The next time a servo frame is encountered from the selected disc surface, servo demodulator 182 provides a signal indicative of that, and address generator 184 increments the bit pointer by one bit location. This causes waveform table 186 to provide, at its output, another binary one. This continues throughout the entire first hexadecimal word stored in Table 1, resulting in a positive polarity waveform for a time period determined by the amount of time required for six servo frames to be encountered by the data head. That is because the first six binary values stored in Table 1 are binary ones.

The next time that a servo frame is encountered, however, address generator 184 increments the bit pointer by one position, and this causes waveform table 186 to provide, at its output, a zero. This causes waveform generator 132 to generate a waveform 192 having a negative polarity relative to the charge on capacitor 130. The negative polarity waveform is provided for five servo frames, at which point a positive polarity waveform is again provided.

It can thus be seen that the waveform is provided according to a predetermined pattern generated based on the binary values stored in waveform table 186, as they are read out in succession. As soon as the end of the first word in Table 1 is reached, the bit pointer is incremented to start reading out binary values from the second word in Table 1. This continues, as each new servo frame is encountered, until a time period when the disc drive is no longer performing a track following operation. Such a time period is generally indicated by the designation numeral 195 in FIG. 8. At that time, the modulation signal is discontinued, or provided at a zero polarity level, so that modulation of the commutation frequency is discontinued during a time period other than a track following operation.

It should also be noted that, in accordance with one aspect of the present invention, the commutation frequency is not modulated during a track seek operation, but only during a track following operation. It is believed that commutation during a track seek operation would introduce undesirable torque disturbance which could have an adverse effect on the execution of track seek operations.

It has also been observed that, just prior to discontinuing the modulation waveform, (i.e., just prior to providing it at a zero polarity level) the modulation waveform should be switched to a logic high level which tends to pull capacitor 130 to a higher level. If it is left at a logic low level just prior to being terminated, this tends to cause the modulation waveform to lower the commutation frequency, even after the modulation waveform has been switched to the zero level. Specifically, this causes higher current surges than normal through the spindle motor. However, by providing the modulation waveform at a logic high level just prior to discontinuing it, the VCO can more easily keep up with small changes in motor speed induced by the seek operation.

Figure 9:
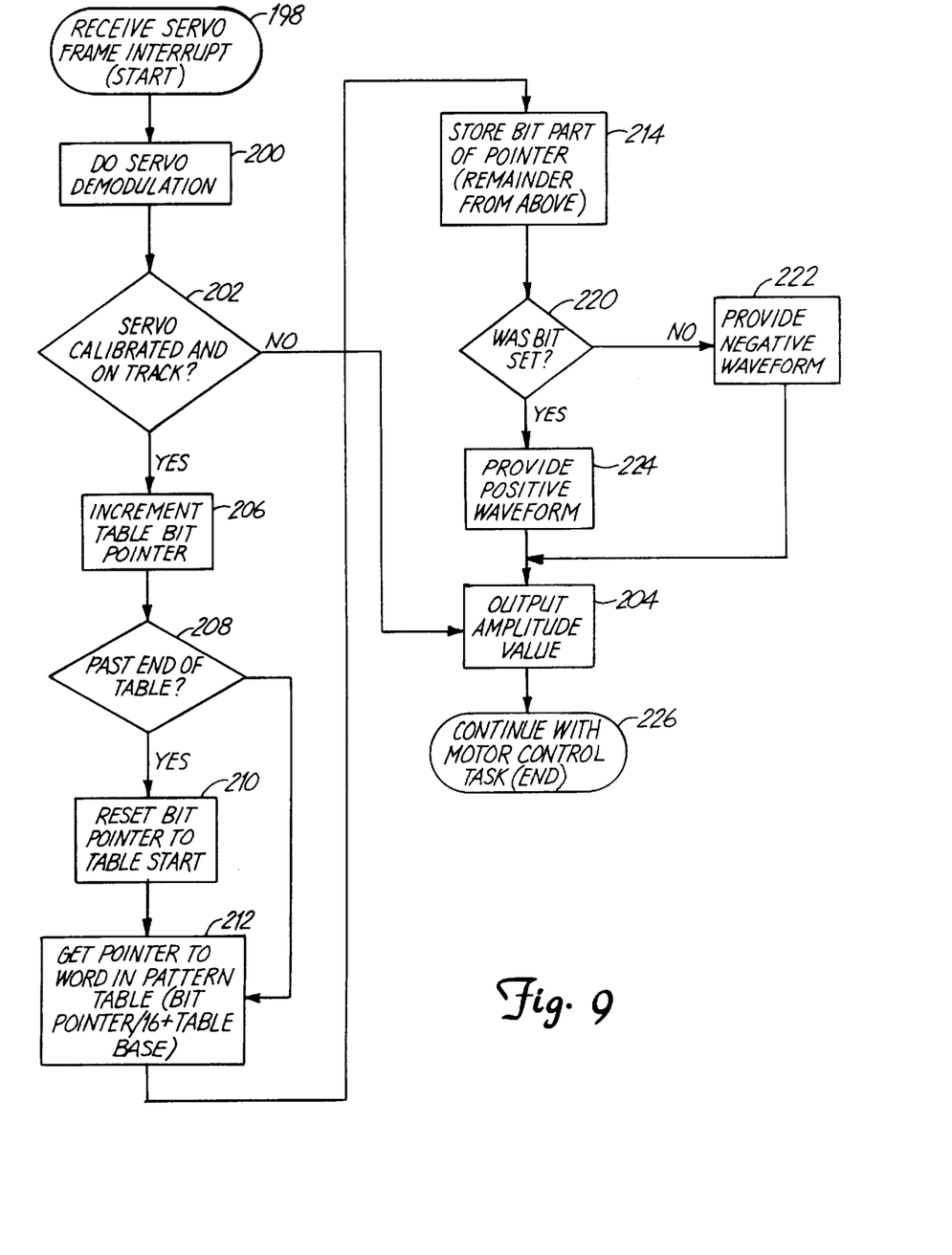
FIG. 9 is a flow diagram illustrating the operation of the system shown in FIG. 7.

FIG. 9 is a flow diagram illustrating the operation of system 180 in obtaining waveform 192. FIG. 9 should be read with reference to both FIGS. 7 and 8.

Since the present invention addresses waveform table 182 at a frequency which is dependent upon the frequency with which servo sectors are read from the surface of a disc 114, system 180 begins by detecting a servo frame interrupt indicating that the system is beginning to read a servo sector from the designated disc surface. This is indicated by block 198 in FIG. 9. Servo demodulator 182 then demodulates the servo signal. This is indicated by block 200.

Since modulation of the commutation frequency is preferably only performed during a track following operation, a determination must be made as to whether a track following operation is being performed. The same processor that is controlling motor speed implements the track follow and seek operations, and thus can allow the address generator 184 to determine whether the servo system in the disc drive is maintaining the data head over a preselected track. This is indicated by block 202.

If so, a track following operation is currently being executed, and modulation of the commutation frequency is appropriate. Thus, processing simply continues down the flow diagram illustrated in FIG. 9.

If, however, a track following operation is not being performed, then the amplitude of the modulation waveform is maintained at its initial, zero level. Processing progresses to block 204, at which the waveform amplitude is provided to the waveform generator. However, since the waveform amplitude is maintained at its zero level, no effective modulation is performed.

Assuming that a track following operation is being performed, as determined at block 202, that means that the bit table pointer, which points to a bit location 190, within a word in Table 1, is incremented. In other words, with the detection of each servo frame, the bit pointer which points to the bit location 190 is incremented by one step. This is indicated by block 206.

It is next determined whether the bit pointer has been incremented to a value which exceeds the number of bit positions in any given word stored in waveform table 186 (a portion of which is shown in Table 1). This is indicated by block 208. If so, then the bit pointer is set back to the start of the table, as indicated by block 210. If, however, the bit pointer has not reached the end of the table, then address generator 184 must determine the appropriate address to be used in obtaining the word from waveform table 186 which is to be used, in conjunction with the bit pointer, in generating modulation waveform 192.

If the bit pointer is past the end of the table, as indicated in block 208, then the bit pointer is reset to the table start as indicated by block 210. However, if the bit pointer is not at the end of the table, as determined in block 208, then address generator 184 must generate an appropriate address such that the bit pointer is pointing to the proper word in memory, and the proper bit location in that word. Since, in one preferred embodiment, each word in memory is a 16 bit word. The bit pointer value is first divided by 16. Then, the table base address (or the address at which the first entry in the waveform table 186 is made) is added to the result of that division. This essentially generates an address which locates the proper word in the memory containing the waveform table. This is indicated by block 212.

The remainder from the division of the bit pointer value by 16 indicates the particular bit in the addressed word to which the pointer is then pointing. This value is stored as indicated by block 214.

Next, the particular bit to which the bit pointer is pointing in the selected word is tested to determine whether it is set or clear (i.e., whether it is a one or zero). This is indicated by block 220. If the bit to which the pointer is pointing is cleared, then it is determined that the waveform should be provided in a negative polarity, as indicated by block 222. However, if the bit is set, then the waveform is to be provided in a positive polarity, as indcted by block 224.

In any case, once the bit has been properly identified and tested, waveform generator 132 provides the waveform in the proper polarity to modulation filter 134. This is indicated by block 204. The motor control task then continues. This is indicated by block 226.

It should also be noted that, while modulation circuits 110 and 181 have been described with respect to preferred embodiments, the present invention contemplates other designs as well. For example, any suitable active or passive filter can be implemented as modulation filter circuit 134. Further, the filter can be a digital or an analog filter, and can be chosen to improve the effectiveness of the desired frequency modulation for any given system. For example, the filter can be designed to specifically avoid or filter all unwanted frequencies (or resonances) from the modulation signal, so that they are never introduced into the commutation signal.

Further, modulation signal source 132 can be any suitable source. The frequency of the modulation signal provided by source 132, and the quantity of charge injected at each edge by the modulation filter can be optimized to produce the desired results and to work in harmony with the initial control loop circuitry. While modulation signal source 132 has been described, in two embodiments, as generating a square wave, the present invention also contemplates using software programmable sources which operate under either simple, or elaborate, software algorithms.

While the present invention can also be implemented using a random modulation signal, which injects random amounts of charge so that the modulation frequency is modulated between any random number of frequencies, this may not be preferred for some systems. For example, if acoustic vibrations are to be eliminated from the system or reduced, a random modulation frequency is not preferred. Each hardware item in the system will tend to vibrate (or resonate) at a given frequency. If those frequencies are known, and eliminated from the modulation frequencies, then the acoustic tones can be eliminated (or substantially reduced) in the system. However, a random modulation frequency will inevitably modulate the commutation frequency to the resonant frequencies of the hardware system. Thus, a random modulation frequency may not eliminate or reduce the acoustic tones which are desired to be eliminated.

Also, while the present invention has been described with respect to eliminating or reducing audible or acoustic emissions from the system, the present invention can be utilized to eliminate emissions throughout the entire electromagnetic spectrum. For example, disc drive arrays are notoriously known for emitting fairly high levels of electromagnetic radiation. In an array in which the preset invention is utilized in the drives in the array, the high frequency harmonics emitted by the array can be significantly reduced.

It should also be noted that the amount of modulation of the commutation angle is directly related to the values of the components chosen in implementing modulation filter 134. For instance, if the componentry in filter 134 is chosen to have an impedance which closely matches that portion of the phase locked feedback circuit 104 to which it is coupled, the modulation waveform will be transmitted to the feedback capacitor 130 to a greater degree than if the impedance is mismatched. The degree to which the modulation waveform should be coupled into the feedback circuit will, of course, vary with each particular application. For instance, it may be desirable to couple more of the modulation waveform into the feedback circuit for heavier drives, or drives which have a greater rotational inertia. However, for lighter drives, which react more quickly to torque disturbance, it may be desirable to couple less of the modulation waveform into the feedback circuit. It has been observed that choosing the filter components in filter 134 such that the modulation waveform is coupled into the feedback capacitor by a sufficient degree to cause the commutation angle to be offset by approximately three-four electrical degrees provides acceptable performance.

In a preferred embodiment, the duty cycle of the modulation waveform is approximately 50% over a long period of time. For example, over a short period of time, the duty cycle will not be 50%. However, preferably the modulation waveform has a duty cycle of approximately 50% over a period of time which is short enough such that the motor will not react to any perceived DC offset in the modulation signal. Thus, no DC offset is injected into the commutation frequency. In fact, the present invention preferably affects the motor speed by less than approximately 0.1%.

The present invention includes a motor control circuit for controlling a motor 106 in a disc drive. The motor control circuit includes a commutation circuit 102 which provides commutation signals to motor 106 at a commutation frequency. A frequency modulation circuit 181 is operably coupled to the commutation circuit 102 and provides a modulation signal 192 which frequency modulates the commutation frequency according to a predetermined pattern.

In one embodiment, the motor 106 exhibits audible resonances at the switching frequency and certain harmonics of the switching frequency. The modulation signal 192 modulates the commutation frequency to spread a frequency spectrum associated with the commutation frequency to reduce the audible resonances at the switching frequency and the certain harmonics.

In one embodiment, the frequency modulation circuit 181 is configured to modulate the commutation frequency according to a frequency modulation waveform 192 which varies among a plurality of different frequencies. Also, the frequency modulation circuit 181 preferably includes a waveform generator 186 and 132 which is configured to generate the modulation waveform 192 according to a predetermined pattern. The waveform generator may comprise a memory 186 storing a bit pattern indicative of the modulation waveform 192, and a waveform circuit 132 providing the modulation waveform based on the bit pattern. The bit pattern, in one embodiment, is indicative of transitions in the modulation waveform 192.

In another embodiment, the disc drive includes discs 114 with disc surfaces having servo sectors thereon, wherein the waveform generator circuit 132 is configured to update the modulation waveform 192 based on the next bit in the bit pattern at a frequency corresponding to changes in servo sectors being read by the disc drive.

In a preferred embodiment, the bit pattern is indicative of a swept sine modulation waveform having a modulating component with a frequency which varies between a starting frequency and an ending frequency. In one embodiment, the starting frequency comprises approximately 20 hertz and the ending frequency comprises approximately 60 hertz.

In another preferred embodiment, the bit pattern is indicative of a sum of sines modulation waveform having a plurality of discrete frequencies.

In another embodiment, a sufficient portion of the modulation signal 192 is injected into the commutation control signal to cause a change in a commutation angle, corresponding to the commutation frequency, in a range of approximately 3–4 electrical degrees. Further, the modulation signal has approximately a 50% duty cycle over a time period having a duration short enough to substantially preclude introduction of a DC component into commutation signals provided to the motor to which the motor can react.

The present invention can also be implemented in terms of a method of controlling a spindle motor in a disc drive. The method includes providing a commutation timing signal, commutating the motor by providing a plurality of commutation signals to the motor at a commutation frequency based on the commutation timing signal, and frequency modulating the timing signal according to a modulation waveform 192 having a predetermined pattern possessing a frequency spectrum having a spectral content which exhibits peaks at frequencies other than the commutation frequency at the predetermined harmonics of the commutation frequency.

In one preferred embodiment, the method also includes providing a memory 186 storing a bit pattern indicative of the modulation waveform 192. The method also includes periodically retrieving portions of the bit pattern from the memory and providing the modulation waveform 192 based on the retrieved portions.

It is to be understood that even though numerous characteristics and advantages of various embodiments of the present invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular drives in which the invention is implemented while maintaining substantially the same functionality without departing from the scope and spirit of the present invention.

We claim:

1. A disc drive, comprising:
   a rotatable disc;
   a motor operably coupled to the disc to drive rotation of the disc; and
   a motor control circuit for controlling the motor, the motor control circuit comprising:
      a commutation circuit which provides commutation signals to the motor to commutate the motor at a commutation frequency; and
      a frequency modulation circuit, operably coupled to the commutation circuit, which provides a modulation signal which frequency modulates the commutation frequency according to a predetermined pattern wherein the motor exhibits audible resonances at the commutation frequency and certain harmonics of the commutation frequency and wherein the modulation signal modulates the commutation frequency to spread a frequency spectrum associated with the commutation frequency to reduce the audible resonances at the commutation frequency and the certain harmonics.

2. The disc drive of claim 1 wherein the modulation signal has an associated spectral content which exhibits peaks at frequencies between the commutation frequency and the certain harmonics of the commutation frequency.

3. The disc drive of claim 2 wherein the frequency modulation circuit receives a modulation waveform signal and modulates the commutation frequency according to the modulation waveform signal which varies among a plurality of different frequencies.

4. The disc drive of 3 wherein the frequency modulation circuit includes a waveform generator circuit generating the modulation waveform signal according to a predetermined pattern.

5. The disc drive of claim 4 wherein waveform generator circuit comprises:
   a memory which stores a bit pattern indicative of the modulation waveform; and
   a waveform circuit which provides the modulation waveform signal based on the bit pattern.

6. The disc drive of claim 5 wherein the bit pattern is indicative of transitions in the modulation waveform signal.

7. The disc drive of claim 6 wherein the disc drive includes disc surfaces having servo sectors thereon and wherein the waveform generator circuit updates the modulation waveform signal based on a next bit in the bit pattern at a frequency corresponding to changes in servo sectors being read by the disc drive.

8. The disc drive of claim 6 wherein the bit pattern is indicative of a swept sine modulation waveform having a modulating component with a frequency which varies between a starting frequency and an ending frequency.

9. The disc drive of claim 8 wherein the starting frequency comprises approximately 20 Hertz (Hz) and wherein the ending frequency comprises approximately 60 Hz.

10. The disc drive of claim 6 wherein the bit pattern is indicative of a sum of sines modulation waveform having a plurality of discrete frequencies.

11. The disc drive of claim 3 wherein the commutation circuit provides commutation signals to the motor based on a commutation control signal and wherein the frequency modulation circuit is coupled to the commutation circuit through a coupling circuit that injects a sufficient portion of the modulation signal into the commutation control signal to cause a change in a commutation angle, corresponding to the commutation frequency, in a range of approximately 3–4 degrees.

12. The motor control circuit of claim 3 wherein the modulation signal has approximately a fifty percent (50%) duty cycle over a time period having a duration short enough to substantially preclude introduction of a direct current (DC) component into commutation signals provided to the motor which the motor can react to.

13. The disc drive of claim 3 wherein the motor comprises a spindle motor in the disc drive, the disc drive being configurable to execute a track seek operation and a track following operation, and wherein the frequency modulation circuit discontinues providing the modulation signal at the predetermined pattern throughout execution of substantially an entire track seek operation.

14. The disc drive of claim 13 wherein the modulation signal varies between a logic high level and a logic low level and the wherein the frequency modulation circuit provides the modulation signal at the logic high level immediately prior to discontinuation of the modulation signal during the track seek operation.

15. A method of controlling a spindle motor in a disc drive, the method comprising steps of:
   (a) providing a commutation timing signal;
   (b) commutating the motor by providing a plurality of commutation signals to the motor at a commutation frequency based on the commutation timing signal; and
   (c) frequency modulating the commutation timing signal according to a modulation waveform having a predetermined pattern corresponding to a frequency spectrum having a spectral content which exhibits peaks at frequencies other than where pure acoustic tones are generated to reduce audible emissions from the disc drive.

16. The method of claim 15 wherein frequency modulating step comprises:
   (c) (i) providing a memory storing a bit pattern indicative of the modulation waveform; and
   (c) (ii) periodically retrieving portions of the bit pattern from the memory and providing the modulation waveform based on the retrieved portions.

17. The method of claim 15 wherein the disc drive is configured to perform track seek and track following operations and wherein frequency modulating step comprises:
   (c) (i) substantially discontinuing frequency modulating the commutation timing signal during track seek operations; and
   (c) (ii) providing the frequency modulation waveform in a logical state which reduces transient waveforms in the commutation signals immediately prior to discontinuing step.

18. The method of claim 15 wherein frequency modulating step comprises frequency modulating the commutation timing signal with the predetermined pattern generally in the form of one of a swept sine waveform and a sum of sines waveform.

19. A disc drive, comprising:
   a rotatable disc;
   a motor operably coupled to the disc to drive rotation of the disc; and a motor control circuit for controlling the motor, the motor control circuit comprising:
    a commutation circuit which provides commutation signals to the motor to commutate the motor at a commutation frequency; and
    a frequency modulation circuit, operably coupled to the commutation circuit, which provides a modulation signal which frequency modulates the commutation frequency according to a predetermined pattern wherein the frequency modulation circuit provides the modulation signal such that a speed of rotation of the motor is changed, based on the modulation signal, by less than approximately 0.1%.

* * * * *

UNITED STATES PATENT AND TRADEMARK OFFICE
CERTIFICATE OF CORRECTION

PATENT NO. : 6,016,043
DATED : January 18, 2000
INVENTOR(S) : Andrew R. Motzko et al.

It is certified that error appears in the above-identified patent and that said Letters Patent is hereby corrected as shown below:

On the title page,

Under [56] References Cited
U.S. Patent Documents

```
--5,453,672    9/26/95   Avitan . . . . . 318/493
  4,382,223    5/3/83    Hedges . . . . . 318/812
  3,573,500    4/6/71    Leonard. . . . . 318/439--.
```

Column 7 - Table: "PAM" should be --RAM--.

Signed and Sealed this

Thirteenth Day of February, 2001

Attest:

NICHOLAS P. GODICI

Attesting Officer     Acting Director of the United States Patent and Trademark Office